United States Patent
Lee et al.

(10) Patent No.: US 7,598,314 B2
(45) Date of Patent: Oct. 6, 2009

(54) SILOXANE DISPERSANT AND NANOPARTICLE PASTE COMPOSITION COMPRISING THE SAME

(75) Inventors: Jae Ho Lee, Yongin-Si (KR); Seong Jae Choi, Seoul (KR); Eun Sung Lee, Seoul (KR); Jae Young Choi, Suwon-Si (KR)

(73) Assignee: Samsung Electro-Mechanics Co., Ltd. (KR)

( * ) Notice: Subject to any disclaimer, the term of this patent is extended or adjusted under 35 U.S.C. 154(b) by 78 days.

(21) Appl. No.: 11/495,408

(22) Filed: Jul. 27, 2006

(65) Prior Publication Data

US 2007/0185261 A1      Aug. 9, 2007

(30) Foreign Application Priority Data

Jan. 20, 2006    (KR) .................. 10-2006-0006213

(51) Int. Cl.
C08G 77/22 (2006.01)
C08G 77/26 (2006.01)
C08G 77/28 (2006.01)
C08G 77/30 (2006.01)
C08L 83/04 (2006.01)
C08L 83/08 (2006.01)

(52) U.S. Cl. .................. 524/588; 528/38; 528/30; 528/41; 524/268; 524/432; 524/437; 524/441

(58) Field of Classification Search ........... 524/588
See application file for complete search history.

(56) References Cited

U.S. PATENT DOCUMENTS

| | | | | |
|---|---|---|---|---|
| 3,496,139 A | * | 2/1970 | Markovitz | 528/27 |
| 3,936,582 A | * | 2/1976 | Keiser | 428/447 |
| 4,020,217 A | * | 4/1977 | Karasudani et al. | 428/429 |
| 4,093,641 A | * | 6/1978 | Plueddemann | 556/405 |
| 5,102,960 A | * | 4/1992 | Imai et al. | 525/476 |
| 5,529,847 A | * | 6/1996 | Chen et al. | 428/413 |
| 5,804,616 A | * | 9/1998 | Mowrer et al. | 523/421 |
| 5,919,487 A | | 7/1999 | Simonnet et al. | 424/490 |
| 6,514,428 B2 | * | 2/2003 | Suzuki et al. | 252/74 |
| 6,592,945 B2 | * | 7/2003 | Suzuki et al. | 427/387 |
| 6,645,569 B2 | | 11/2003 | Cramer et al. | 427/466 |

(Continued)

FOREIGN PATENT DOCUMENTS

JP      6170079    *    4/1986

(Continued)

OTHER PUBLICATIONS

"Magnetic cobalt dispersions in poly(dimethylsiloxane) fluids"; Authors: J.P. Stevenson, et al.; Journal of Magnetism and Magnetic Materials 225 (2001) 47-58.

*Primary Examiner*—Randy Gulakowski
*Assistant Examiner*—Robert Loewe
(74) *Attorney, Agent, or Firm*—Cantor Colburn LLP (57) ABSTRACT

Provided is a siloxane dispersant having a structure including a head part having an affinity for nanoparticles and a tail part having an affinity for a polydimethylsiloxane (PDMS) resin, and a nanoparticle paste composition comprising the same. The dispersant significantly improves dispersion efficiency of a polydimethylsiloxane resin system which is used in preparation of high-output light sources such as UV LEDs and the like.

13 Claims, 4 Drawing Sheets

U.S. PATENT DOCUMENTS

| | | | |
|---|---|---|---|
| 6,713,586 B2 * | 3/2004 | Greene | 528/34 |
| 6,803,719 B1 * | 10/2004 | Miller et al. | 313/501 |
| 6,815,064 B2 * | 11/2004 | Treadway et al. | 428/403 |
| 6,869,864 B2 * | 3/2005 | Yim et al. | 438/497 |
| 7,029,514 B1 * | 4/2006 | Yang et al. | 75/348 |
| 2004/0014888 A1 * | 1/2004 | Fournier et al. | 525/100 |
| 2004/0259363 A1 * | 12/2004 | Bawendi et al. | 438/689 |
| 2005/0148752 A1 * | 7/2005 | Klaassens et al. | 528/38 |
| 2005/0228111 A1 * | 10/2005 | Furuzono et al. | 524/497 |
| 2006/0193805 A1 * | 8/2006 | Johnson et al. | 424/70.12 |
| 2006/0204528 A1 * | 9/2006 | Nolte et al. | 424/401 |
| 2006/0269506 A1 * | 11/2006 | De Caire et al. | 424/70.122 |
| 2007/0036962 A1 * | 2/2007 | Sasaki et al. | 428/292.1 |
| 2007/0051927 A1 * | 3/2007 | Itoh et al. | 252/500 |
| 2007/0172426 A1 * | 7/2007 | Lee et al. | 424/9.32 |
| 2007/0176154 A1 * | 8/2007 | Murase et al. | 252/601 |
| 2007/0213492 A1 * | 9/2007 | Mowrer et al. | 528/17 |
| 2007/0249747 A1 * | 10/2007 | Tsuji et al. | 522/3 |
| 2007/0292486 A1 * | 12/2007 | Sen et al. | 424/443 |

FOREIGN PATENT DOCUMENTS

| | | | |
|---|---|---|---|
| JP | 05139997 A | * | 6/1993 |
| JP | 07070204 A | * | 3/1995 |
| JP | 11233331 A | * | 8/1999 |
| JP | 2000026796 A | * | 1/2000 |
| JP | 2000265081 A | * | 9/2000 |
| JP | 2002341569 A | * | 11/2002 |

* cited by examiner

SILOXANE DISPERSANT AND NANOPARTICLE PASTE COMPOSITION COMPRISING THE SAME

BACKGROUND OF THE INVENTION

This non-provisional application claims priority to Korean Patent Application No. 2006-006213 filed on Jan. 20, 2006, and all the benefits accruing therefrom under 35 U.S.C. § 119(a), the content of which is herein incorporated by reference in its entirety.

1. Field of the Invention

The present invention relates to a siloxane dispersant and a nanoparticle paste composition comprising the same. More particularly, the present invention relates to a siloxane dispersant having a structure including a head part having affinity for nanoparticles and a tail part having affinity for a polydimethylsiloxane (hereinafter, referred to as "PDMS") resin, and a nanoparticle paste composition comprising the same.

2. Description of the Related Art

Quantum dots are nanometer-scale semiconductor materials exhibiting quantum confinement effects, and are widely used in a variety of electrical and optical devices, due to their superior physical, chemical and electrical properties.

For application to various devices, such quantum dots are usually mixed with a dispersion medium such as a conventional solvent or resin and are used in the form of a previously prepared paste. However, quantum dots exhibit a tendency to form aggregates because a cohesive force between particles is very strong from the viewpoint of the properties of the nanoparticles. As a result, formation of such aggregates may cause problems in that unique properties of the quantum dots cannot sufficiently be exerted. Therefore, selection of a dispersant to be used should be more carefully considered such that aggregation between nanoparticles does not occur in the solvent or resin.

Meanwhile, as conventional solvents for nanoparticles, there are known nonpolar organic solvents such as toluene, hexane and the like, and polar binder resins such as epoxy resins, PDMS resins, acrylic resins and the like. Among these materials, the PDMS resins, which have a structure of siloxane-based backbones as a main chain, exhibit excellent properties such as high stability to heat, UV light and oxidants, superior transparency, relatively low refractivity and high insulation capacity, and therefore are very useful for application to electronic materials, particularly optical materials.

However, since the dispersants, used in synthesis of nanoparticles, are composed of hydrocarbon-based chains that are nonpolar, surfaces of nanoparticles show poor affinity for PDMS resins. It is therefore impossible to successfully disperse nanoparticles without modification of surface properties thereof. As such, there has been an urgent need for the development of a novel type of a dispersant that can be easily dispersed in the PDMS resins without causing aggregation or precipitation.

In this connection, U.S. Pat. No. 6,645,569 discloses a technique of improving dispersibility of nanoparticles for ink jet printing, involving introduction of a polyethylene oxide group or trimethyl ammonium group into a siloxane backbone. U.S. Pat. No. 5,919,487 discloses a technique of improving dispersibility of nanoparticles involving coating nanoparticles via introduction of a polyethylene oxide group or polypropylene oxide group into a siloxane backbone. However, unlike the present invention, these US patents do not involve functional groups that directly bind to nanoparticles.

In addition, Journal of Magnetism and Magnetic Materials 225 (2001) 47-58 discloses a technique of dissolving a cobalt precursor in poly[dimethylsiloxane-b-(3-cyanopropyl)methylsiloxane-b-dimethylsiloxane] to form cobalt nanoparticles, and then dispersing the thus-formed nanoparticles in the PDMS resin. This method does not particularly use a dispersant unlike the present invention, but instead uses a nitrile group as a functional group that binds to nanoparticles, which is distinctly different from the present invention.

SUMMARY OF THE INVENTION

Therefore, the present invention has been made in view of the above problems, and it is an object of the present invention to provide a novel type of a dispersant that is capable of improving dispersibility via dispersion of nanoparticles in a polydimethylsiloxane (PDMS) resin which is used in preparation of high-output light sources such as UV LEDs and the like.

It is another object of the present invention to provide a nanoparticle paste composition having improved dispersibility in a PDMS resin system.

It is yet another object of the present invention to provide a silicone rubber having curability in a PDMS resin system.

In accordance with an aspect of the present invention, the above and other objects can be accomplished by the provision of a siloxane dispersant having a structure including a head part having affinity for nanoparticles and a tail part having affinity for a PDMS resin.

In accordance with another aspect of the present invention, there is provided a nanoparticle paste composition comprising i) a dispersant of the present invention, ii) nanoparticles and iii) a PDMS resin.

In accordance with yet another aspect of the present invention, there is provided a silicone rubber, which is formed by dispersing nanoparticles in a PDMS resin using a dispersant having an amine-based head part and a PDMS-based tail part, and adding a PDMS resin having an epoxy group to the resulting dispersion, followed by heat treatment.

In accordance with yet another aspect of the present invention, there is provided a silicone rubber comprising the reaction product of nanoparticles, a dispersant having an amine-based, carboxylic acid-based, mercaptan-based, or phosphonate-based head part and PDMS-based tail part, and a PDMS resin having an epoxy end group, wherein the nanoparticles are homogeneously dispersed, and the silicone rubber exhibits homogeneous photoluminescent.

In accordance with yet another aspect of the present invention, there is provided a method of making a silicone rubber comprising dispersing nanoparticles in a polydimethylsiloxane resin using a dispersant having an amine-based head part and a polydimethylsiloxane-based tail part, adding a polydimethylsiloxane resin having an epoxy group to the resulting dispersion, and heat-treating the dispersion.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the present invention will be described in more detail with the accompanying drawings.

It will be understood in the following disclosure of the present invention, that as used herein, the singular forms "a", "an" and "the" are intended to include the plural forms as well, unless the context clearly indicates otherwise. It will be further understood that the terms "comprise", "comprises", and "comprising," when used in this specification, specify the presence of stated features, integers, steps, operations, elements, components, and combination of the foregoing, but do not preclude the presence and/or addition of one or more other features, integers, steps, operations, elements, components, groups, and combination of the foregoing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A dispersant according to the present invention comprises a head part having affinity for nanoparticles and a tail part having affinity for a polydimethylsiloxane (PDMS) resin.

Specifically, the dispersant in accordance with the present invention contains the head part selected from the group represented by Formula 1 or 2 below and the tail part selected from the group represented by Formula 3 below.

Group of amine-based head parts are represented by Formula 1:

(1)

wherein each R is independently hydrogen or $C_1$-$C_4$ alkyl.

Group of head parts including carboxylic acid, mercaptan, and phosphonic acid functionality are represented by Formula 2:

(2)

Group of tail parts represented by Formula 3:

(3)

$$-\overset{|}{\underset{|}{Si}}-O-\left(\overset{|}{\underset{|}{Si}}-O\right)_n-\overset{|}{\underset{|}{Si}}-,$$

$$-\overset{|}{\underset{|}{Si}}-\left(O-\overset{|}{\underset{|}{Si}}\right)_x-O-\overset{|}{\underset{|}{Si}}-O-\left(\overset{|}{\underset{|}{Si}}-O\right)_y-\overset{|}{\underset{|}{Si}}- \quad \text{and}$$

$$-\overset{|}{\underset{|}{Si}}-\left(O-\overset{|}{\underset{|}{Si}}\right)_x-O-\left(\overset{|}{\underset{|}{Si}}-O\right)_y-\overset{|}{\underset{|}{Si}}-$$

wherein n is an integer of 2 to 30, and x and y are independently an integer of 2 to 20.

That is, the dispersant has a structure in which an unshared electron pair present in the head part can readily form a coordination bond with metal ions on the surface of the nanoparticles, via inclusion of the head part of the dispersant selected from the group represented by Formula 1 or 2, and which has high affinity for a dispersion medium, i.e., PDMS resin, via inclusion of the PDMS tail part of the dispersant as selected from the group represented by Formula 3.

More specifically, the dispersant may be represented by Formulae 4 through 26 below:

(4)

(5)

(6)

(7)

(21)

(22)

(23)

(24)

(25)

(26)

where, Formulae 4 through 26, each R is independently hydrogen or $C_1$-$C_4$ alkyl, n is an integer of 2 to 30, and x and y are each independently an integer of 2 to 20.

Another aspect is directed to a nanoparticle paste composition. The nanoparticle paste composition comprises i) a dispersant of the present invention, ii) nanoparticles and iii) a PDMS resin.

Specifically, the nanoparticles utilized in the present invention may include, for example Group II-VI, Group III-V, Group IV-VI or Group IV compound semiconductors or metals and magnetic particles. Preferred examples of such nanoparticles include, are not limited to, CdS, CdSe, CdTe, ZnS, ZnSe, ZnTe, GaN, GaP, GaAs, GaSb, AlN, AlP, AlAs, AlSb, InP, InAs, InSb, SiC, Fe, Pt, Ni, Co, Al, Ag, Au, Cu, FePt, $Fe_2O_3$, $Fe_3O_4$, Si and Ge. In addition, the present invention may also employ core-shell nanoparticles. The size of nanoparticles, which is utilizable in the present invention, is not particularly limited, but is preferably within the range of 2 nm to 30 nm.

As the PDMS resin used in the present invention, common PDMS and derivatives thereof, which are applied to conventional nanoparticle paste compositions, may be employed.

In addition to the dispersant, the nanoparticle paste composition may further include other conventional additives such as a plasticizer, a leveling agent, an antioxidant, a smoothing agent and a defoaming agent, within the range in which they are not detrimental to properties of the composition. These additives are well known to those skilled in the art to the extent that they are commercially available.

The nanoparticle paste composition comprises 40 to 70% by weight of nanoparticles, and 0.1 to 3% by weight of the dispersant, based on the total weight of nanoparticle, dispersant and PDMS resin. Use of the dispersant in an amount of less than 0.1% by weight can significantly adversely affect both the ability to increase the amount of nanoparticles in the nanoparticle paste composition, and the maintenance of viscosity. In addition, when the amount of added dispersant exceeds 3% by weight, there can be deterioration of paste properties can deteriorate as a result of the decreased content of other components.

A further aspect is directed to a silicone rubber, which is formed by curing a nanoparticle paste composition, which in turn comprises a dispersion formed by dispersing nanoparticles in a PDMS resin using a dispersant having an amine-based head part and a PDMS-based tail part, and adding a PDMS resin having an epoxy group to the resulting dispersion, followed by heat treatment.

The nanoparticle paste composition disclosed herein can contain a dispersant for which the head part of the dispersant is a Lewis base. Dispersants having a Lewis base head part include the amine-based head parts of Formula 1. When a curable PDMS resin (e.g., for example, a silanez-vinyl crosslinkable PDMS resin) is used, which is curable in the presence of a metal catalyst (e.g., for example, platinum, palladium, and the like), the metal catalyst can combine with the head part of the Lewis acid dispersant and thereby interfere with the curing of the nanoparticle paste composition to form the silicone rubber. Accordingly, when it is desirable to prepare a cured silicone rubber in the presence of a dispersant having a Lewis base head part, the curing process should be performed in the absence of the metal catalyst, using a non-metal catalyzed, curable PDMS resin. To this end, a silicone rubber, and a method of forming, comprises dispersing nanoparticles with a dispersant having an amine-based head part in a PDMS resin or combination of PDMS resins having epoxy groups, followed by heat-treating. The heat-treating effects a chemical cure of the PDMS resin by ring-opening and cross-reacting of the epoxy groups, catalyzed by the amine group of the dispersant. As such, it is possible to obtain a cured silicone rubber.

The dispersants having an amine-based head part and a PDMS-based tail part may be used alone or in any combination thereof. Combined use of two or more dispersants having an amine-based head part and a PDMS-based tail part is advantageous to control hardness.

In another embodiment, nanoparticles and PDMS resin are the same as described above, except that the dispersant has an amine-based head part selected from the group represented by Formula 1, or head parts including carboxylic acid, mercaptan, or phosphonic acid functionality represented by Formula 2, and a PDMS-based tail part selected from the group represented by Formula 3. In a specific embodiment, the dispersant is selected from the dispersants represented by Formulae 4 through 11 and 15 through 23. In a more specific embodiment, the dispersant is represented by Formula 19 or 23.

In addition, the PDMS resin having an epoxy group may be specifically represented by Formula 27 below.

wherein n is an integer of 2 to 30.

The silicone rubber may be formed by mixing the foregoing nanoparticles, dispersant, and PDMS resin having epoxy groups, and heating the resulting mixture at a temperature of 70 to 150° C. for 0.5 to 12 hours. A silicone rubber thus can comprise the heat-cured product of nanoparticles, the dispersant having an amine-based, carboxylic acid based, mercaptan based, or phosphonic acid based head part, and a polydimethylsiloxane-based tail part, and the polydimethylsiloxane resin having an epoxy group. The nanoparticles in both the nanoparticle paste composition and the silicone rubber are homogeneously dispersed. In addition, the nanoparticles so dispersed, and therefore both the nanoparticle paste composition and silicone rubber, can exhibit homogeneous photoluminescence.

EXAMPLES

The present invention is further described herein in more detail with reference to the following examples. These examples are provided only for illustrating the present invention and should not be construed as limiting the scope and spirit of the present invention.

Preparative Example 1

Preparation of Siloxane Dispersant (1)

Trimethylsilanol was gradually added in a 1:1 ratio to 1,7-dichlorooctamethyltetrasiloxane in dry toluene. Next, in order to replace the resulting acid and remaining chloro groups with hydroxyl groups, aqueous ammonia was added to the mixture, which was then stirred vigorously. The resulting organic solution was washed with water and dried using a desiccant. To the thus-dried reaction materials was gradually added 0.5 equivalents of N-(2-aminoethyl)-3-aminopropyl-methyldimethoxy silane which was dissolved in dry toluene. The mixed solution was heated to a temperature of 80 to 100° C. and reacted for 24 hours. The reaction solution was heated under reduced pressure, thereby completely removing volatile materials.

Preparative Example 2

Preparation of Siloxane Dispersant (2)

A dispersant was obtained in the same manner as in Preparative Example 1, except that a reaction product of polydimethylsiloxane terminated with a hydroxyl group and having a number-averaged molecular weight (Mn) of 550 g/mol (1,7-dihydroxyoctamethyltetrasiloxane) in a ratio of 1:2 was used instead of the 1,7-dichlorooctamethyltetrasiloxane of Preparative Example 1.

Preparative Example 3

Preparation of Siloxane Dispersant (3)

Hexamethylcyclotrisiloxane was mixed with 1 to 10 mol % N-2-aminoethyl)-3-aminopropylmethyldimethoxy silane, and a trace amount of trimethylsilanol potassium salt as a catalyst was added thereto to perform polymerization. Chlorotrimethylsilane was then added to complete polymerization, and a by-product, potassium chloride, was removed from the reaction by washing with water. The dried synthesized product was distilled under reduced pressure to remove volatile components. Viscosity was adjusted by changing the time until chlorotrimethylsilane was added.

Example 1

Preparation of Nanoparticle Paste Composition (1)

Nanoparticles suitable for the preparation of a nanoparticle paste composition, commercially available as CdSe/ZnS (EviDots® from Evident) were used. 20 mL of the dispersant obtained in Preparative Example 1 was added to a solution of about 3% (wt) nanoparticles in toluene (0.5 ml), and toluene was removed in vacuo. A PDMS resin having a low molecular weight (PDMS, 5 cSt, available from Dow Corning) (2 mL) was added to the remaining nanoparticles, thereby preparing a nanoparticle paste composition of the present invention.

Example 2

Preparation of Nanoparticle Paste Composition (2)

A nanoparticle paste composition was prepared in the same manner as that of Example 1, except that the dispersant (20 mL) obtained in Preparative Example 2 was added instead of a dispersant obtained in Preparative Example 1.

Comparative Example 1

A nanoparticle paste composition was prepared in the same manner as in Example 1, except that no dispersant was added.

Example 3

Preparation of Silicone Rubber (1)

The same procedure as that used in Example 1 was carried out, except that the dispersant (1 g) obtained in Preparative Example 3 was added instead of a dispersant obtained in Preparative Example 1. Then, a PDMS resin having an epoxy group, represented by Formula 27 (Epoxypropoxypropyl-terminated Polydimethylsiloxane, available from Gelest) (0.2 g) was added thereto and the resulting mixture was heated at a temperature of 80° C. for 12 hours, thereby preparing a cured silicone rubber.

Example 4

Preparation of Silicone Rubber (2)

A cured silicone rubber was prepared in the same manner as in Example 3, except that the dispersant (20 mL) obtained in Preparative Example 2 was added prior to addition of a dispersant obtained in Preparative Example 3.

Figure 1:
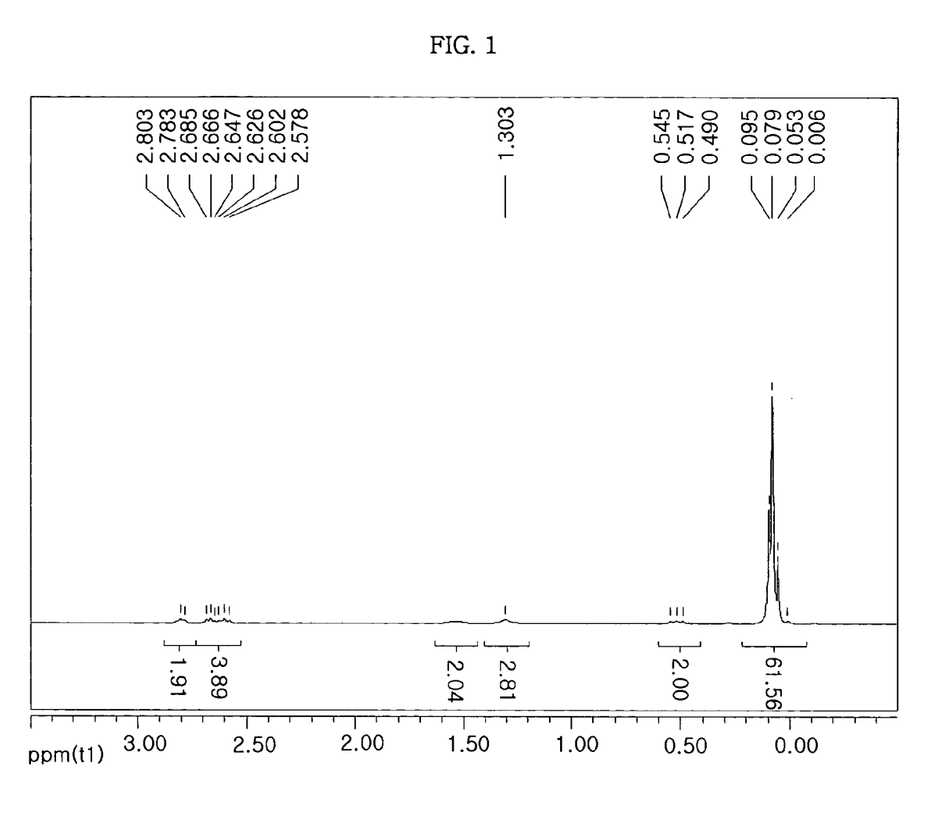
FIG. 1 is a $^1$H-NMR spectrum of the dispersant according to Example 1.
Figure 2:
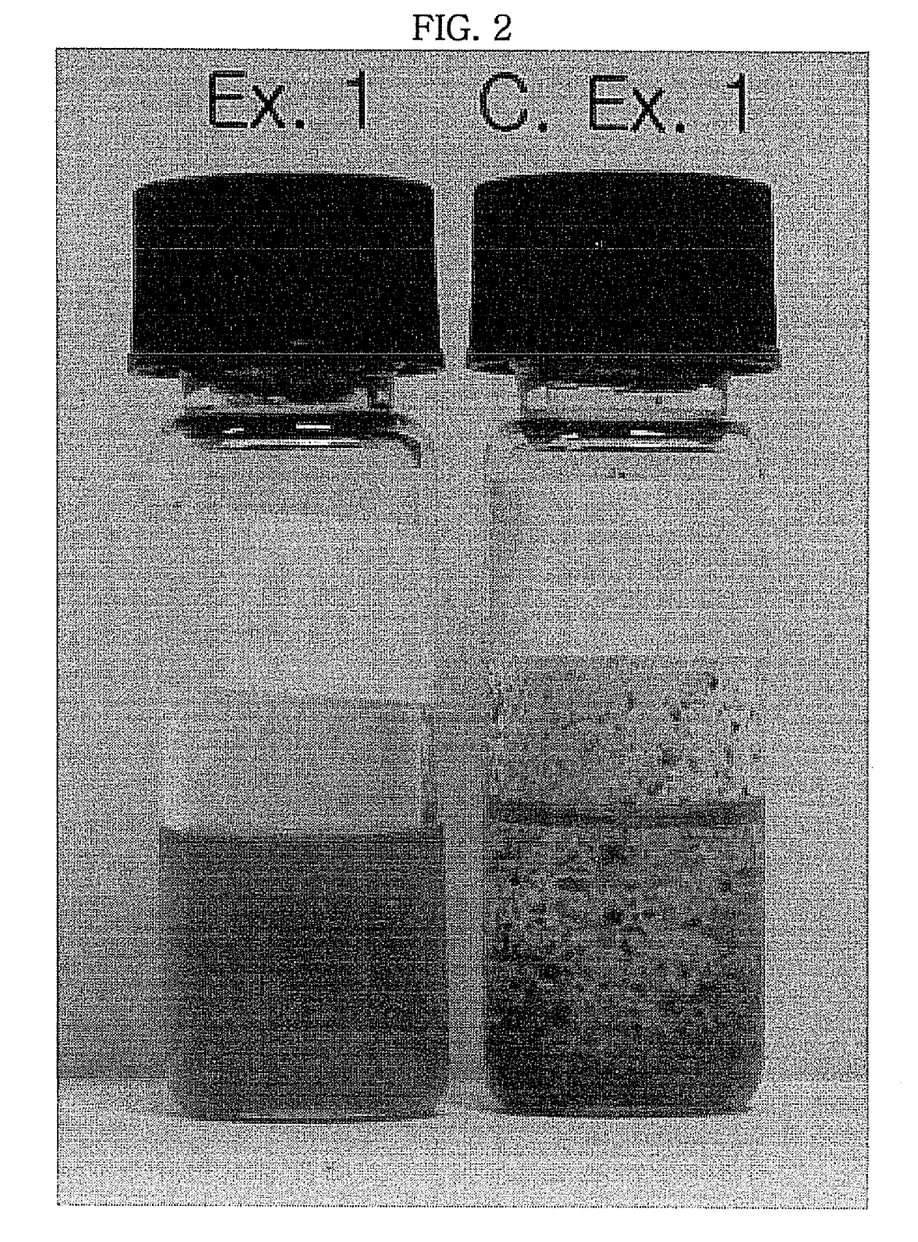
FIG. 2 is a photograph showing comparison of dispersibility of nanoparticle paste compositions according to Example 1 and Comparative Example 1.

FIG. 2 is a photograph showing comparison of dispersibility between nanoparticle paste compositions obtained in Example 1 and Comparative Example 1. Referring now to FIG. 2, it can be confirmed that Example 1, to which the dispersant was added, exhibited superior dispersibility, whereas Comparative Example 1 with no addition of the dispersant exhibited poor dispersibility.

Figure 3:
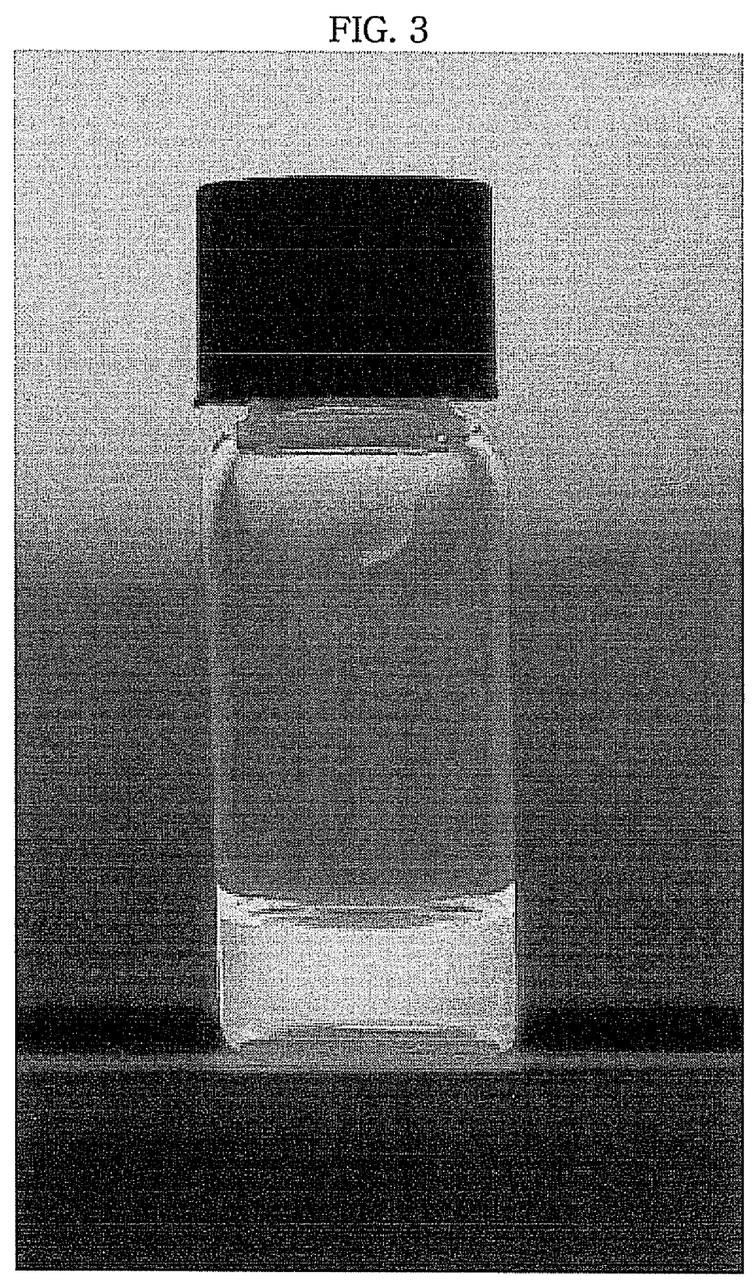
FIG. 3 is a photograph showing dispersibility of a nanoparticle paste composition according to Example 2.

In addition, FIG. 3 is a photograph showing dispersibility of nanoparticles in the nanoparticle paste composition obtained in Example 2. Referring now to FIG. 3, it can be confirmed that nanoparticles exhibited homogeneous dispersion and photoluminescence within the PDMS resin.

Figure 4:
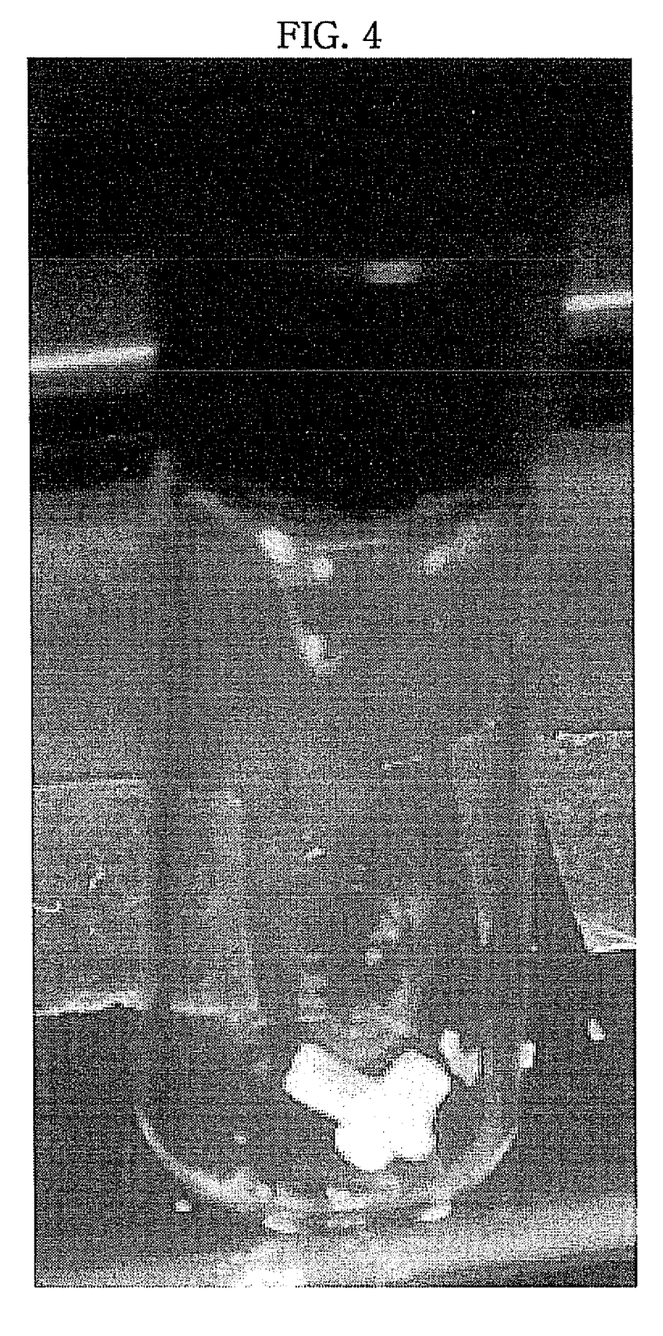
FIG. 4 is a photograph showing photoluminescence of a silicone rubber according to Example 3.

Further, FIG. 4 is a photograph of a cured silicone rubber obtained in Example 3. Referring now to FIG. 4, it can be confirmed that nanoparticles exhibited homogeneous dispersion and photoluminescence within the silicone rubber which was cured in the form of a small bar.

The dispersant in accordance with the present invention exhibits superior dispersibility-improving effects when it is used in a PDMS resin system, and therefore can be effectively applied to a variety of high-output light sources such as UV LEDs and the like.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A siloxane dispersant having a structure including a head part having affinity for nanoparticles and a tail part having affinity for a polydimethylsiloxane resin, wherein the siloxane dispersant contains the head part selected from the group consisting of:

wherein each R is independently hydrogen or $C_1$-$C_4$ alkyl; or a group represented by and the tail part selected from the group consisting of:

, and wherein n is an integer of 2 to 30, and x and y are independently an integer of 2 to 20; or wherein the siloxane dispersant contains the head part selected from the group consisting of the formulas

,

, and wherein each R is defined above, and the tail part is of the formula wherein x, and y are each defined above; or wherein the siloxane dispersant contains the head part of the formula wherein each R is as defined above, and the tail part is wherein x, and y are each defined above; or
wherein the siloxane dispersant contains as the head part

, and the tail part is or

.

2. The siloxane dispersant according to claim 1, wherein the dispersant is represented by formulae 4, 5, 9, 11, 14 through 16, 20, 22, 25, and 26:

(4)

(5)

wherein each R is independently hydrogen or $C_1$-$C_4$ alkyl,
n is an integer of 2 to 30, and
x and y are each independently an integer of 2 to 20.

3. A nanoparticle paste composition comprising
a siloxane dispersant having a structure including a head part having affinity for nanoparticles and a tail part having affinity for a polydimethylsiloxane resin, wherein the siloxane dispersant contains the head part selected from the group consisting of:

wherein each R is independently hydrogen or $C_1$-$C_4$ alkyl; or a group represented by:

the tail part selected from the group consisting of:

wherein n is an integer of 2 to 30, and x and y are independently an integer of 2 to 20; or
wherein the siloxane dispersant contains the head part selected from the group consisting of the formulas wherein each R is defined above, and the tail part is of the formula wherein x, and y are each defined above; or
wherein the siloxane dispersant contains the head part selected from the group consisting of the formulas wherein each R is defined above, and the tail part is wherein x, and y are each defined above; or
wherein the siloxane dispersant contains as the head part the tail part is wherein x, and y are each defined above;
nanoparticles, and
a polydimethylsiloxane resin,
wherein the nanoparticles are selected from the group consisting of Group II-VI, Group III-V, Group IV-VI or Group IV compound semiconductors and metals.

4. The nanoparticle paste composition according to claim 3, wherein the composition contains 40% to 70% by weight of nanoparticles and 0.1 to 3% by weight of the dispersant, based on the total weight of nanoparticles, dispersant, and the polydimethylsiloxane resin.

5. The nanoparticle paste composition according to claim 3, wherein the nanoparticles are selected from the group consisting of CdS, CdSe, CdTe, ZnS, ZnSe, ZnTe, GaN, GaP, GaAs, GaSb, AlN, AlP, AlAs, AlSb, InP, InAs, InSb, SiC, Fe, Pt, Ni, Co, Al, Ag, Au, Cu, FePt, Si, and Ge.

6. The nanoparticle paste composition according to claim 3, wherein the nanoparticle has a core-shell structure.

7. A silicone rubber, formed by dispersing nanoparticles in a polydimethylsiloxane resin using a dispersant having a heterocyclic amine-based, diamine-based, triamine-based, carboxylic acid-based, mercaptan-based, or phosphonic acid-based head part, and a polydimethylsiloxane-based tail part, and adding a polydimethylsiloxane resin having an epoxy group to the resulting dispersion, followed by heat treatment.

8. The silicone rubber according to claim 7, wherein the dispersant having a heterocyclic amine-based, diamine-based, or triamine-based head part and a polydimethylsiloxane-based tail part is used in combination of two or more dispersants.

9. The silicone rubber according to claim 7, wherein the dispersant having a heterocyclic amine-based, diamine-based, or triamine-based head part and a polydimethylsiloxane-based tail part is selected from the groups represented by formulae 4, 5, 7 through 11, 15 through 17, and 19 through 23:

(4)

(5)

(7)

(8)

(9)

(10)

(11)

-continued

(15)

(16)

(17)

(19)

-continued wherein each R is independently hydrogen or $C_1$-$C_4$ alkyl,
n is an integer of 2 to 30, and
x and y are each independently an integer of 2 to 20.

10. The silicone rubber according to claim 7, wherein the polydimethylsiloxane resin having an epoxy group is represented by formula 27:

wherein n is an integer of 2 to 30.

11. The silicone rubber according to claim 7, wherein the silicone rubber is formed by heat treatment at a temperature of 70 to 150° C. for 0.5 to 12 hours.

12. A silicone rubber, comprising the heat-cured product of:
nanoparticles,
a dispersant having a heterocyclic amine-based, diamine-based, triamine-based, carboxylic acid-based, mercaptan-based, or phosphonic acid-based head part, and a polydimethylsiloxane-based tail part, and
a polydimethylsiloxane resin having an epoxy group,
wherein the nanoparticles are homogeneously dispersed, and wherein the silicone rubber exhibits homogeneous photoluminescence.

13. A method of forming a silicone rubber, comprising:
dispersing nanoparticles in a polydimethylsiloxane resin using a dispersant having a heterocyclic amine-based, diamine-based, or triamine-based head part and a polydimethylsiloxane-based tail part,
adding a polydimethylsiloxane resin having an epoxy group to the resulting dispersion, and
Heat-treating the dispersion at a temperature of 70 to 150° C. for 0.5 to 12 hours.

* * * * *